Figure 1:
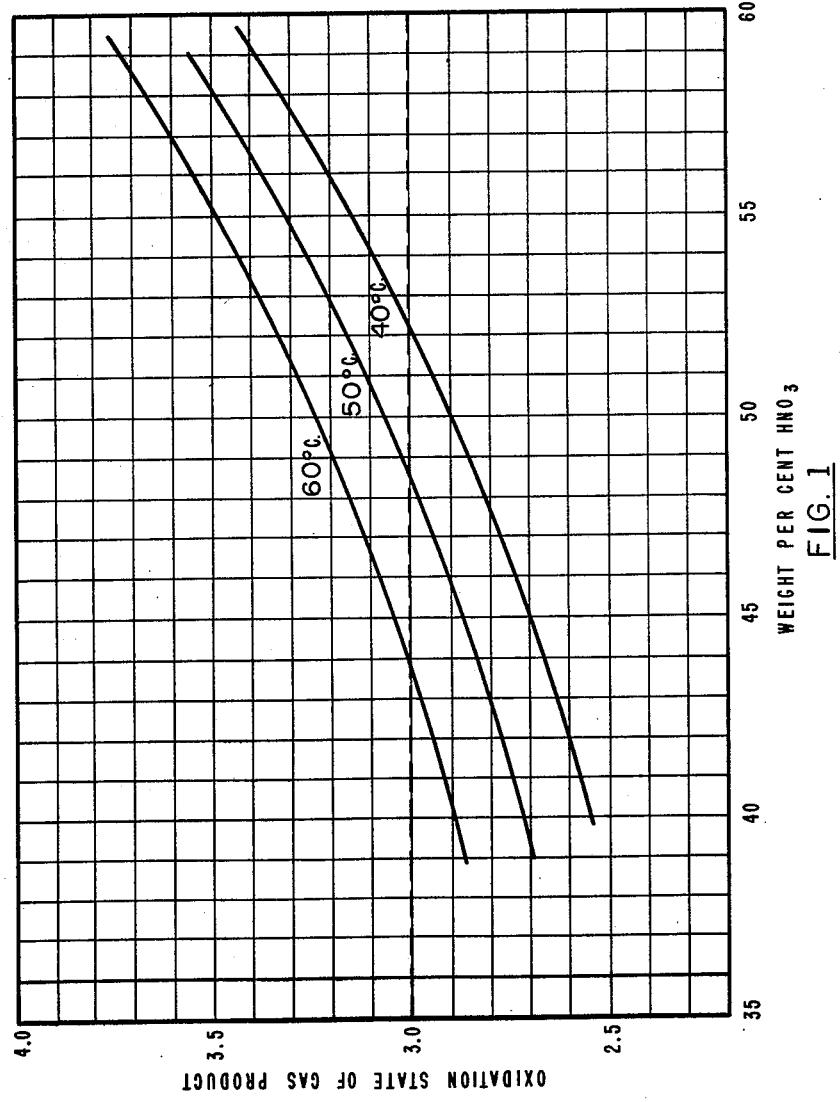

May 3, 1960   D. R. LEVERING ET AL   2,935,480
PREPARATION OF NITROGEN OXIDES
Filed July 20, 1956   3 Sheets-Sheet 1

DEWEY R. LEVERING
LUCIEN G. MAURY
INVENTORS

BY Ernest G. Peterson

AGENT.

May 3, 1960   D. R. LEVERING ET AL   2,935,480
PREPARATION OF NITROGEN OXIDES
Filed July 20, 1956   3 Sheets-Sheet 2

DEWEY R. LEVERING
LUCIEN G. MAURY
INVENTORS

BY  Ernest G. Peterson
AGENT.

May 3, 1960  D. R. LEVERING ET AL  2,935,480
PREPARATION OF NITROGEN OXIDES
Filed July 20, 1956  3 Sheets-Sheet 3

DEWEY R. LEVERING
LUCIEN G. MAURY
INVENTORS

BY Ernest G. Peterson

AGENT.

'
2,935,480
PREPARATION OF NITROGEN OXIDES

Dewey Robert Levering, Wilmington, and Lucien G. Maury, Brookside, Del., assignors to Hercules Powder Company, Wilmington, Del., a corporation of Delaware Application July 20, 1956, Serial No. 599,174

19 Claims. (Cl. 252—186)

This invention relates to the production of nitrogen oxide product containing fixed nitrogen of predetermined state of oxidation. In one aspect this invention relates to the production of nitrogen oxide product, containing fixed nitrogen having an average state of oxidation in the range of from about 2.4 to 3.2, which are particularly suitable in condensed form as nitrosating agents in the nitrosation of amines, by the utilization of known equilibria of nitrogen oxides, nitrous acid and nitric acid mixtures. In another aspect this invention relates to utilization of various side streams in an ammonia oxidation system in the production of nitrogen oxide product containing fixed nitrogen of predetermined state of oxidation.

It is well known that when any or all of the nitrogen oxide species, and/or nitrous acid, are in admixture with either nitric acid or water, the following equilibria are rapidly established:

(1) $3NO_2 + H_2O = 2HNO_3 + NO$
(2) $2NO_2 = N_2O_4$
(3) $NO + NO_2 = N_2O_3$
(4) $HNO_3 + N_2O_4 = HNO_2 + N_2O_5$
(5) $NO + NO_2 + H_2O = 2HNO_2$
(6) $HNO_3 = H^+ + NO_3^-$

The equilibrium constants of the foregoing reactions depend upon the temperature and the pressure of the system and, accordingly, at a given temperature, pressure and nitric acid concentration, the amount of any of the above species at equilibrium is fixed. If one of the above species, for example, is added to the system, the equilibrium is temporarily upset but it rapidly returns to its initial value, all other conditions remaining constant. At any given temperature and pressure the partial pressures of the various nitrogen oxides above a body of nitric acid are fixed by the values of the equilibrium constants for the foregoing reactions. If $NO_2$, for example, is added to a body of nitric acid, equilibrium is temporarily upset but is rapidly re-established and the partial pressure of each of the nitrogen oxides and nitrous acid returns to its original value. The situation is the same if the added nitrogen oxide be $NO_2$ or any one or all of the nitrogen oxides and/or nitrous acid of the foregoing reactions. With varying conditions of any one or all of nitric acid concentration, temperature and pressure of such an equilibrium system are obtained correspondingly different proportions of nitrogen oxides in the gas phase above the nitric acid.

This invention utilizes nitrogen oxide equilibria, particularly those discussed hereinabove, in the preparation of a nitrogen oxide product of predetermined fixed nitrogen oxidation state, and particularly such product suitable as a nitrosation agent in the nitrosation of secondary amines.

An object of this invention is to provide for the production of nitrogen oxide-containing mixtures containing fixed nitrogen in a predetermined state of oxidation. Another object is to provide for the preparation of nitrogen oxide-containing mixtures wherein the average state of oxidation of the fixed nitrogen is in a range particularly suitable for utilization as a nitrosation agent in the nitrosation of secondary amines. Another object is to provide for utilization of available by-product streams recoverable at various points in an ammonia oxidation-nitric acid manufacturing plant, as feedstock, in the preparation of nitrogen oxide-containing mixtures containing fixed nitrogen of predetermined oxidation state, and particularly such mixtures having utility as nitrosation agents in the nitrosation of secondary amines. Other aspects and objects are apparent in light of the accompanying disclosure and the appended claims.

In accordance with this invention a process is provided which comprises contacting at least one of the group of nitric oxide, nitrogen dioxide, nitrogen trioxide, nitrogen tetroxide, nitrogen pentoxide, and nitrous acid with nitric acid under conditions of pressure, temperature and acid concentration, correlated to provide gas product containing fixed nitrogen of a predetermined oxidation state. Further in accordance with this invention, at least one of the group of nitric oxide, nitrogen dioxide, nitrogen trioxide, nitrogen tetroxide, nitrogen pentoxide and nitrous acid is contacted with nitric acid under conditions of temperature, pressure and nitric acid concentration correlated to produce nitrogen oxide gas product in which the oxidation state of the fixed nitrogen is in a range especially suitable for use, when in liquid state, as a nitrosation agent in the nitrosation of secondary amines, such range being generally within the limits of about 2.4 to 3.2.

Although any suitable correlation of temperature, pressure and acid concentration conditions to produce gas product of predetermined oxidation state is within the scope of our invention, we have found that in most instances the conditions correlated are those selected from a temperature range of about 25–100° C., a pressure range of from about 0.5 to 15 atmospheres and an acid concentration range of from about 30 to 70 weight percent $HNO_3$. However, the equilibrium characteristics of the reactions equated hereinabove are well known, in light of which, and in light of the present disclosure, one skilled in the art can correlate specific conditions selected from any suitable range of temperature, pressure and acid concentration values.

With reference to nitric acid concentration in such an equilibrium system, it will be appreciated that the presence of extraneous materials may influence ionization of nitric acid present so as to vary the effective nitric acid concentration. Thus the presence of alkaline materials or sulfuric acid will alter the nitric acid concentration accordingly by the extent of ionization effected. However, the desired nitric acid concentration can always be obtained in any given instance by varying temperature and pressure conditions accordingly.

In view of the various equilibria, such as discussed above, there is no need in the practice of our invention for regulating in any way the relative proportions of nitrogen oxides or nitrous acid in the feed. The relative component proportions, or oxidation state of the feed, can be changed at any time during the process without affecting the composition of the product gas stream. Our invention, therefore, can be considered as a "rectification" in which a nitrogen oxide gas stream is "automatically" converted to the desired composition and oxidation state such as by merely sparging the gas through nitric acid under conditions of temperature, pressure and nitric acid concentration correlated in accordance with this invention.

With reference to Fig. 1 there are graphically shown results of a number of runs made in the preparation of nitrogen oxide gas product of predetermined oxidation state by contacting a nitrogen oxide or oxides of the group named herein with nitric acid under correlated conditions of temperature, pressure and acid concentration. In those runs mixtures of nitrogen dioxide and nitrogen tetroxide, and also nitric oxide alone as the feed gas stream were sparged through aqueous nitric acid at one atmosphere under conditions of temperature and acid concentration shown, to form gas product of predetermined oxidation state including product suitable in condensed form as an amine nitrosating agent.

These curves illustrate the effect on the average state of oxidation of the fixed nitrogen, of change in temperature and change in nitric acid concentration. Thus, a nitrogen oxide-containing gas of say oxidation state 3 can be prepared from any nitrogen oxide gas mixture at 60° C. with aqueous nitric acid containing about 44 weight percent $HNO_3$, at one atmosphere. By decreasing the temperature to 50° C., the oxidation state has been lowered to 2.83; by changing the acid concentration to 50 percent $HNO_3$, the oxidation state of the gas product is 3.25. At pressures in the order of one atmosphere the oxidation state of the gas product increases with increased temperature and with increased nitric acid concentration.

Fig. 1 illustrates many additional sets of correlated conditions for producing gas product of desired oxidation state and particularly for product which in condensed form is especially suitable as an amine nitrosating agent.

With reference to Table 1 are shown additional exemplary correlated temperature, acid concentration and pressure conditions relating to runs made in the preparation of nitrogen oxide gas mixtures in accordance with our invention. All runs were made at one atmosphere. Runs 1 through 15 were made employing a feed stream consisting of nitrogen dioxide and nitrogen tetroxide, the volume ratio of nitrogen dioxide to nitrogen tetroxide varying with temperature as dictated by their equilibrium relationships. Runs 16–17 were made employing nitric oxide as the feed. Thus, formation of the desired product was approached employing feed streams of markedly different state of oxidation. The rectifier was an upright vessel equipped with a gas disperser at the bottom. Aqueous nitric acid was passed into the rectifier and the gas feed stream was sparged through it. The amount of gas fed into the rectifier and the amount of gaseous nitrogen oxide condensed, (Dry Ice trap) were measured. Two samples were taken of the gas product. The total acidity of one sample was measured and the total oxidizable material in the other was measured. Based on those data the average oxidation state in each run was calculated as follows:

Oxidation state
$$= \frac{4 \text{ (wt. percent oxidn.} + 3.07 \text{ (wt. percent oxidn. state 4)} \text{ state 2)}}{\text{(wt. percent oxidn.} + 1.54 \text{ (wt. percent oxidn. state 4)} \text{ state 2)}}$$

Table 1

| Run No. | Feed Gas | Temp., °C. | Nitric Acid Conc., Wt. Percent $HNO_3$ | Av. Oxidn. State of Fixed Nitrogen |
| --- | --- | --- | --- | --- |
| 1 | $N_2O_4+NO_2$ | 60 | 58.7 | 3.70 |
| 2 | $N_2O_4+NO_2$ | 60 | 58.3 | 3.71 |
| 3 | $N_2O_4+NO_2$ | 50 | 58.6 | 3.44 |
| 4 | $N_2O_4+NO_2$ | 60 | 51.0 | 3.30 |
| 5 | $N_2O_4+NO_2$ | 50 | 51.3 | 3.15 |
| 6 | $N_2O_4+NO_2$ | 50 | 50.8 | 3.22 |
| 7 | $N_2O_4+NO_2$ | 40 | 50.9 | 3.11 |
| 8 | $N_2O_4+NO_2$ | 60 | 42.8 | 3.00 |
| 9 | $N_2O_4+NO_2$ | 40 | 46.2 | 2.77 |
| 10 | $N_2O_4+NO_2$ | 40 | 48.4 | 2.95 |
| 11 | $N_2O_4+NO_2$ | 60 | 47.9 | 3.03 |
| 12 | $N_2O_4+NO_2$ | 60 | 47.6 | 3.03 |
| 13 | $N_2O_4+NO_2$ | 50 | 39.2 | 2.74 |
| 14 | $N_2O_4+NO_2$ | 40 | 39.6 | 2.54 |
| 15 | $N_2O_4+NO_2$ | 40 | 52.7 | 3.01 |
| 16 | NO | 50 | 47.4 | 3.01 |
| 17 | NO | 50 | 47.4 | 2.98 |

The following tabulated data, Table 2, are further exemplary of correlated conditions of superatmospheric pressure, temperature and acid concentration that can be employed in the rectification of any one or more of the defined nitrogen oxides and/or nitrous acid to form gas product of predetermined oxidation state.

Table 2

| Pressure, p.s.i.g. | Temp., °C. | Nitric Acid Conc., Wt. Percent | Av. State of Oxidn. of Fixed Nitrogen in Gas Product |
| --- | --- | --- | --- |
| 120 | 110 | 62.0 | 2.9 |
| 120 | 79 | 62.0 | 3.03 |
| 120 | 53 | 62.0 | 3.13 |
| 120 | 110 | 59.5 | 3.2 |
| 120 | 79 | 59.5 | 3.31 |
| 120 | 53 | 59.5 | 3.42 |
| 120 | 110 | 65.0 | 2.68 |
| 45 | 53 | 62.0 | 3.50 |
| 60 | 110 | 62.0 | 3.02 |
| 60 | 79 | 62.0 | 3.17 |
| 60 | 53 | 62.0 | 3.29 |
| 65 | 110 | 65.0 | 3.50 |
| 65 | 79 | 65.0 | 3.28 |
| 65 | 53 | 65.0 | 3.11 |
| 100 | 110 | 62.0 | 2.8 |
| 100 | 79 | 62.0 | 2.9 |
| 100 | 53 | 62.0 | 3.0 |
| 140 | 110 | 65.0 | 2.6 |
| 140 | 79 | 65.0 | 2.72 |
| 140 | 53 | 65.0 | 2.88 |

Figure 2:
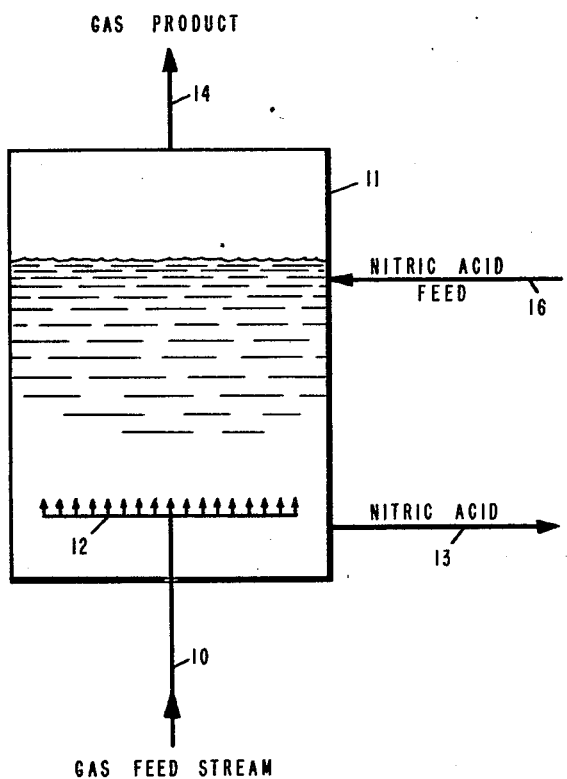

Our invention is further illustrated with reference to Fig. 2 which is a diagrammatic flow sheet of a now preferred embodiment of our invention. Thus, with reference to Fig. 2, a nitrogen oxide feed stream is passed via line 10 into rectifier 11. The feed stream in line 10 may be any available nitrogen oxide-containing stream, for example, such a stream taken from a nitric acid manufacturing plant or a nitric acid concentration plant. Thus, feed in line 10 can be a gas stream from the dehydrating tower of a nitric acid concentration plant or a gas stream evolved during bleaching of nitric acid. Typical analyses (wt. percent) of such gas streams are as follows:

| Off Gas from Dehydrating Tower | | Off Gas from Bleaching Nitric Acid | |
| --- | --- | --- | --- |
| | Percent | | Percent |
| NO | 40 | $NO_2$ | 40 |
| $NO_2$ | 40 | $N_2O_4$ | 40 |
| $N_2O_4$ | 15 | NO | 5 |
| $O_2$ | 5 | $N_2$ | 13 |
| | | $O_2$ | 2 |

Feed from line 10 is passed into reactor 11 via gas disperser 12 so as to sparge the feed gases through the aqueous nitric acid in zone 11. Agitation of the feed gases with nitric acid, as by sparging, is important in order to form the nitrogen oxide product at optimum rates and to provide uniform, constant temperature, the reaction being exothermic. However, if desired, reaction temperature can be controlled in any suitable manner, such as by heating or cooling, as the case may be, by indirect heat exchange.

Nitric acid is passed in and out of the reactor at a rate sufficient to maintain the requisite $HNO_3$ concentration. Thus, if the feed stream from line 10 has an average oxidation state of more than 3, nitric acid will be formed during the contacting step and if the feed stream is of a lower oxidation state than 3, water will be formed, in either case it being necessary to remove continuously (or intermittently at frequent intervals) nitric acid from the contacting zone 11 and to supply replacement nitric acid of the requisite concentration and amount. Nitric acid is withdrawn from zone 11 via line 13 and replacement nitric acid is introduced into zone 11 via line 16. Gaseous nitrogen oxide product of desired oxidation state is withdrawn from zone 11 via line 14.

The feed stream to the rectification zone, as for example zone 11, may contain inert gases (as nitrogen, carbon dioxide, etc.) without affecting the operation of the rectification process. However, the gaseous nitrogen oxide product is generally condensed (e.g., to nitrogen trioxide) and it is somewhat difficult to effect such condensation from streams containing large amounts of the inert gas, as for example in excess of about 70 volume percent.

In general, it is desirable to limit the amount of any free oxygen present in the rectification system because oxygen will be carried through the nitric acid into the product gas stream and oxidize the product gas to a state of oxidation higher than that contemplated. However, oxygen can be present, if desired, in which case the rectifier is operated under such conditions that a nitrogen oxide product of oxidation state lower than that ultimately desired is formed. The oxygen carried out of the rectifier with the product gases is then permitted to oxidize the gases, such as in the product lines or in a specially provided hold-tank, so that upon reaction of all of the oxygen present, the predetermined desired oxidation state is obtained.

In the practice of the foregoing described embodiment, nitric acid withdrawn from the rectifier 11 is saturated with nitrogen oxide product and thus considerable amounts of nitrogen oxides may be lost in the withdrawn acid. This loss can be off-set by feeding the rectifier with a nitric acid stream already saturated with nitrogen oxides. Exemplary of such saturated nitric oxide streams available from commercial plant operations are those recoverable from various types nitric acid plants, such as those referred to hereinafter.

Although a one-stage rectifier is illustrated with reference to Fig. 2, rectification can be carried out in several stages. Thus, a multistage rectifier can be made by superpositioning several rectifiers such as that in Fig. 2. Ordinary bubble-cap or packed columns may be used for multistage rectification.

As stated hereinabove any nitrogen oxide of the group defined herein, alone or in admixture with one or more other such nitrogen oxides and/or nitrous acid, can be employed as a feed gas in our process. It is thus a feature of our invention that we can utilize any one or more by-product streams of nitrogen oxides and/or nitric acid in an ammonia oxidation-nitric acid manufacturing plant, as a gas feed for our process, and can operate at the same pressure as that at which the by-product stream is recovered.

Figure 3:
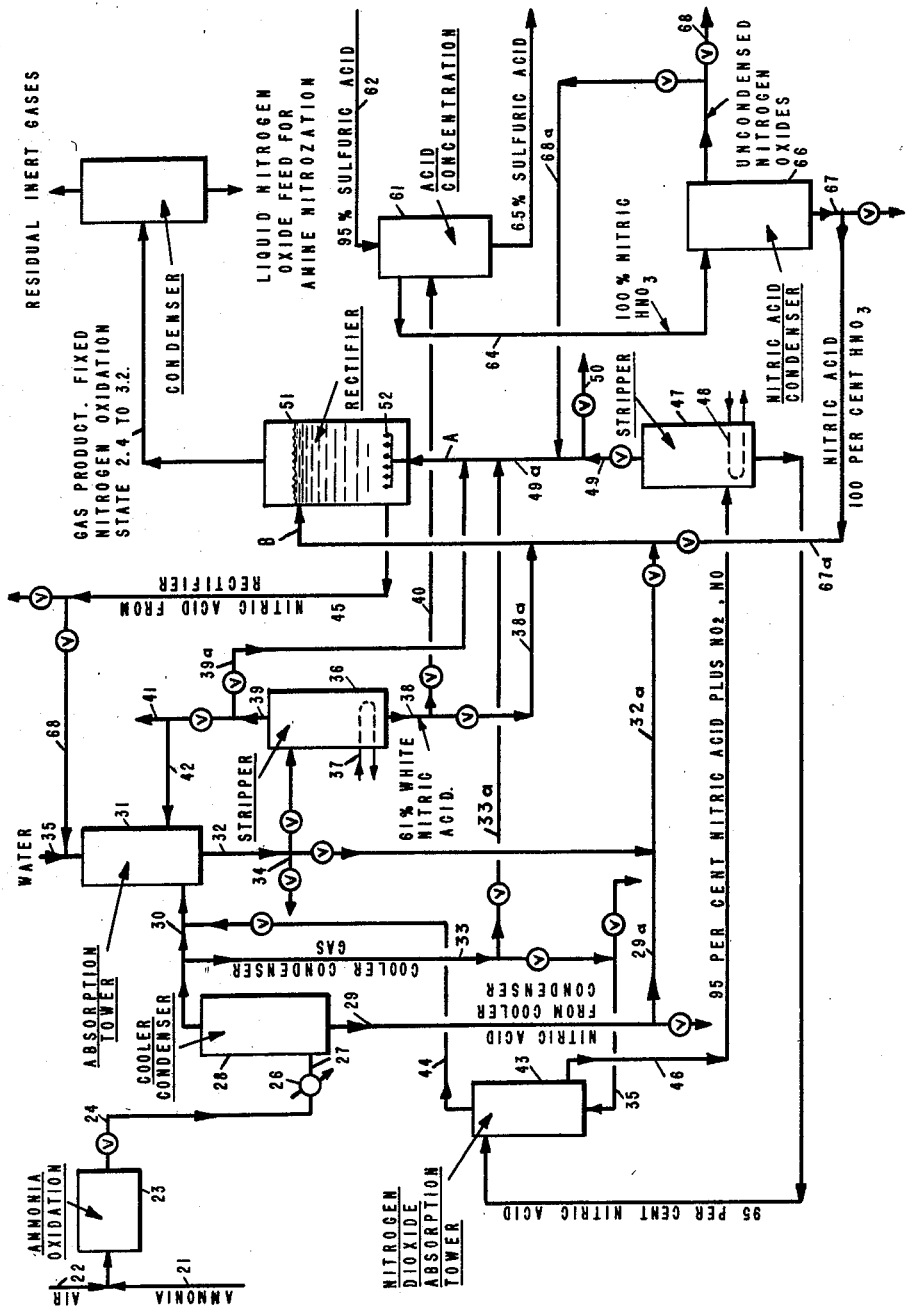

Thus, with reference to Fig. 3, ammonia from line 21, with air from line 22, is introduced, in a suitable ammonia to air gas volume ratio such as from about 9:1 to 11:1, into catalytic oxidation chamber 23 containing any suitable ammonia oxidation catalyst such as 90 percent platinum-10 percent rhodium, at a catalyst temperature of about 900 to 1200° C. and at a pressure of about 0 to 200 p.s.i.g. Effluent gas from chamber 23, in line 24, is passed through cooler 26 and cooled therein to about 900° F., and then passed via line 27 into condenser 28 wherein it is cooled to generally about 100° F. and condensation of nitric acid takes place, the latter being saturated with nitrogen oxide gases. Condensate containing about 35–55 weight percent $HNO_3$ is recovered as a result of total cooling in cooler 26 and chamber 28, by way of line 29, and constitutes one source of nitric acid for our process.

Gaseous nitrogen oxides, uncondensed in condenser 28, primarily a mixture of nitric oxide and nitrogen dioxide, are passed from chamber 28 by line 30 together with water from line 35 to absorption tower 31 wherein the gaseous oxides are contacted countercurrently with the water to form aqueous, generally 61 percent, nitric acid withdrawn by way of line 32.

Gaseous nitrogen oxide can be withdrawn from the system by way of line 33; nitrogen oxide gases in line 33a and nitric acid in line 29a can be utilized as feed to our rectification process as described hereinafter. These streams are both respectively referred to herein as cooler-condenser gases and nitric acid from the cooler-condenser.

Sixty-one percent nitric acid from line 32, substantially saturated with nitrogen oxides constitutes another source of nitric acid for our rectification process and can be withdrawn for that purpose by way of line 32a. However, preferably, nitric acid from line 32 is passed through stripping chamber 36 heated by heat source 37 at a temperature such as at about 180° F. to separate nitrogen oxides therefrom for return to tower 31 via lines 39 and 42 or withdrawal via line 41; and for recovery of 61 percent white nitric acid via line 38. Nitrogen oxide gases from stripping, in line 39, can be charged by way of line 39a to our rectification process.

It is often practice in the art to pass condenser gas from condenser 28, as by lines 33 and 35 into absorption contact relation with 95 per cent nitric acid in absorption chamber 43 for absorption of nitrogen dioxide and return of residual nitric oxide to absorption chamber 31 via line 44. Enriched absorbent from chamber 43 is passed via line 46 into stripper 47 and therein heated under stripping conditions (heating coil 48) to liberate nitrogen dioxide via lines 49 and 50. Nitrogen dioxide from line 49 constitutes another source of feed to our rectification process by way of line 49a.

It is often desired to pass 61 percent nitric acid from line 38 via line 40 to chamber 61 in contact therein with 95 percent sulfuric acid from line 62. Sixty-five percent sulfuric acid is withdrawn from chamber 61 via line 63. Uncondensed vapor which is substantially 100 percent $HNO_3$ is withdrawn from chamber 61 via line 64, and condensed in condenser 66. Substantially 100 percent nitric acid is withdrawn from condenser 66 via line 67 and can be passed for feeding to rectifier 51 by way of line 67a. Uncondensed nitrogen oxides from condenser 66 are withdrawn via line 68, and constitute another source of nitrogen oxide feed for rectification in rectifier 51 via line 68a.

As illustrated with reference to Fig. 3, numerous sources of feed to our rectification process are advantageously by-product streams in an ammonia oxidation plant. Exemplary compositions of such by-product streams above illustrated are as follows:

| Wt., percent | Stream Number | | | | | | | |
|---|---|---|---|---|---|---|---|---|
| | Nitric Acid Stream | | | | Gaseous Nitrogen Oxide Stream | | | |
| | 29a | 32a | 38a | 67a | 33a | 39a | 49a | 68a |
| NO | 0.4 | 0.2 | 0 | 0 | 5.0 | 15 | 1 | 35 |
| $NO_2$ | 1.0 | 1.0 | 0 | 0 | 2.0 | 50 | 70 | 40 |
| $N_2O_3$ | 0.1 | 0.1 | 0 | 0 | 0.1 | 1 | 1 | 1 |
| $N_2O_4$ | 0.5 | 0.5 | 0 | 0 | 2.0 | 30 | 26 | 30 |
| $N_2O_5$ | 0 | 0 | 0 | 0 | 0 | 0 | 0 | 2 |
| $N_2O$ | 0 | 0 | 0 | 0 | 0.1 | 0 | 0 | 0 |
| $HNO_2$ | 0 | 0 | 0 | 0 | 0 | 1 | 0 | 0 |
| $HNO_3$ | 35–55 | 60 | 60 | 100 | 0 | 3 | 2 | 4 |

In one embodiment of our rectification in conjunction with use of by-product streams of the kind above illustrated, gas product from line A is sparged through nitric acid from line B in rectifier 51, by way of sparger 52. Nitric acid is withdrawn from rectifier 51 via line 45 to maintain the requisite amount and concentration of nitric acid in rectifier 51, and is recycled via line 68 to absorption tower 31 with water from line 35 from which 61 percent nitric acid is withdrawn as above described and which can then be fed as nitric acid feed to rectification chamber 51, either stripped free from nitrogen oxides or saturated therewith, or concentrated for recycle such as illustrated.

Exemplary of well known ammonia oxidation catalysts that can be employed in chamber 23 of Fig. 3 are platinum, platinum-rhodium alloys, platinum-rhodium-palladium alloys, mixtures of base metal oxides, and the like. In our copending application, Serial No. 599,173, filed July 20, 1956, is disclosed and claimed a process for nitrosation of secondary amines employing nitrogen trioxide and also liquefied nitrogen oxide gas product of this invention. In our copending application, Serial No. 467,227, filed November 5, 1954, we have disclosed and claimed a process for nitrosation of secondary amines employing nitric oxide as a nitrosating agent.

Generally when the intended oxidation state of the fixed nitrogen of the gas product is the same as the oxidation state of one of the said oxides, the last said oxide when introduced into the zone of said contacting is a component of a mixture containing at least one other of said group of oxides and nitrous acid. However, inasmuch as the gas product obtained, when the oxidation state of the intended product is the same as that of a single oxide to be reacted, will always contain small concentrations of other oxide by-products, it is within the scope of our invention to charge any one of such nitrogen oxides alone or as a component of a mixture of nitrogen oxides.

Although nitrogen oxide gas product of this invention is particularly well applied in liquid state as a nitrosation agent as discussed hereinabove, it is also advantageously applied as a nitrating agent in the nitration of paraffins and of olefins. This one can, in either of those cases, alter the product distribution as a function of the oxidation state of the fixed nitrogen in the nitrogen oxide product employed as the nitrating agent, the latter of course being regulated in accordance with this invention.

As will be evident to those skilled in the art, various modifications can be made or followed in the light of the foregoing disclosure and discussion, without departing from the spirit or scope of the disclosure or from the scope of the claims.

What we claim and desire to protect by Letters Patent is:

1. A process for the preparation of a nitrogen oxide gas mixture particularly suitable, when in liquid phase, as a nitrosation agent for secondary amines which comprises passing at least one of the group consisting of nitric oxide, nitrogen dioxide, nitrogen trioxide, nitrogen tetroxide, nitrogen pentoxide and nitrous acid, and mixtures thereof, as a gas, in contact with aqueous nitric acid and, during said contact, reacting said gas with said nitric acid under equilibrium conditions of temperature, pressure and acid concentration within the respective ranges of 25 to 100° C., 0.5 to 15 atmospheres, and from 30 to 70 weight percent so as to form a gas product containing fixed nitrogen having an average oxidation state within the range of 2.4–3.2 and recovering product so produced.

2. A process of claim 1 wherein said oxidation state is about 3.

3. A process of claim 1 wherein at least a portion of said gas passed in contact with said nitric acid is a by-product stream from a catalytic ammonia oxidation process for the production of nitric acid.

4. A process for the preparation of a nitrogen oxide gas mixture particularly suitable, when in liquid phase, as a nitrosation agent for secondary amines which comprises passing as a gas at least one of the group consisting of nitric oxide, nitrogen dioxide, nitrogen trioxide, nitrogen tetroxide, nitrogen pentoxide and nitrous acid, and mixtures thereof, in contact with aqueous nitric acid and, during said contact, reacting said gas with said nitric acid under equilibrium conditions of acid concentration, temperature and pressure within the respective ranges of from 30 to 70 weight percent $HNO_3$, from 25 to 100° C. and from 0.5 to 15 atmospheres so as to form a gas product containing fixed nitrogen having an average oxidation state within the range of 2.4 to 3.2, and when free oxygen is present in said gas terminating said reacting to form fixed nitrogen product short of said average oxidation state and then reacting the last said product with at least a portion of said oxygen to form said product having said average oxidation state, and recovering product so produced.

5. A process of claim 4 wherein said gas to be contacted with nitric acid is sparged through a body of said nitric acid and the said average state of oxidation is about 3, whereby substantially nitrogen trioxide gas product is formed which as condensate is especially suitable as a nitrosating agent in the nitrosation of secondary amines.

6. A process of claim 5 wherein the sparged gas is nitric oxide.

7. A process of claim 5 wherein the sparged gas is a mixture of nitrogen dioxide and nitrogen tetroxide.

8. A process of claim 4 wherein said nitric acid is contacted with a gas stream recovered as off-gas from cooling and partially condensing gas effluent from a catalytic air oxidation of ammonia.

9. A process of claim 4 wherein said nitric acid comprises condensate recovered from cooling and partially condensing gas effluent from catalytic air oxidation of ammonia.

10. A process of claim 4 wherein said nitric acid comprises aqueous nitric acid formed by catalytic air oxidation of ammonia, cooling and partially condensing gas effluent from said oxidation, and absorbing off-gas from said condensation, in water, to produce said aqueous nitric acid containing nitrogen oxides.

11. A process of claim 4 wherein said nitric acid is contacted with gas product formed by catalytic air oxidation of ammonia, cooling and partially condensing gas effluent from said oxidation, absorbing off-gas from said condensation in water to form aqueous nitric acid containing nitrogen oxides and stripping said nitrogen oxides from said aqueous nitric acid for said contacting.

12. A process of claim 10 wherein said oxides are removed from said aqueous nitric acid and wherein residual aqueous acid is then concentrated in contact with sulfuric acid to form 100 percent $HNO_3$ gas, and wherein said 100 percent $HNO_3$ gas is then condensed to comprise said nitric acid for contacting.

13. A process of claim 4 wherein said gas to be contacted with nitric acid is formed by catalytic air oxidation of ammonia, and comprises off-gas from absorption of gas effluent from said oxidation, in concentrated nitric acid.

14. A process of claim 4 wherein said nitric acid comprises aqueous nitric acid formed by catalytic air oxidation of ammonia, cooling and partially condensing gas effluent from said oxidation, absorbing off-gas from said condensation, in water, to produce said aqueous nitric acid, and stripping said aqueous acid of gas oxides contained therein to produce residual aqueous nitric acid for said contacting.

15. A process of claim 4 wherein nitric acid is withdrawn from the zone of nitrogen oxide-nitric acid contacting and passed to an absorption step wherein off-gas from cooling and partial condensation of gas effluent from catalytic air-oxidation of ammonia is absorbed in water to produce aqueous nitric acid, and recycling nitric acid thus formed to said contacting zone to replace the withdrawn nitric acid, the said rate of withdrawal of nitric acid and the rate of recycle of nitric acid being such as to maintain the requisite nitric acid concentration for said contacting.

16. A process of claim 15 wherein said aqueous nitric acid is concentrated prior to said recycle.

17. A process for the preparation of a nitrogen oxide gas mixture particularly suitable, when in liquid phase, as a nitrosation agent for secondary amines which comprises sparging gas of at least one of the group consisting of nitric oxide, nitrogen dioxide, nitrogen trioxide, nitrogen tetroxide, nitrogen pentoxide and nitrous acid, and mixtures thereof, through a body of aqueous nitric acid under equilibrium conditions of temperature, nitric acid concentration and pressure within the respective ranges of 25–100° C., 30 to 70 weight percent $HNO_3$, and 0.5 to 15 atmospheres, so as to form a gas product in which the average oxidation state of the fixed nitrogen is from 2.4 to 3.2, and when free oxygen is present in said gas terminating said reacting to form fixed nitrogen product short of said average oxidation state and then reacting the last said product with at least a portion of said oxygen to form said product having said average oxidation state, withdrawing nitric acid from the sparging zone and replacing same with nitric acid at a rate and in a concentration requisite for maintaining the said acid concentration, and withdrawing gas product from said zone.

18. A process of claim 17 wherein said oxidation state is about 3, and condensing said product to substantially nitrogen trioxide.

19. A process of claim 4 wherein said gas to be contacted with nitric acid is substantially free from free oxygen.

References Cited in the file of this patent

UNITED STATES PATENTS

| | | |
|---|---|---|
| 1,163,174 | Raschig | Dec. 7, 1915 |
| 1,337,106 | Thomson | Apr. 13, 1920 |
| 1,901,816 | Luscher | Mar. 14, 1933 |
| 1,979,544 | Hechenbleikner | Nov. 6, 1934 |
| 2,098,953 | Christensen | Nov. 16, 1937 |